United States Patent [19]

van der Lely et al.

[11] 3,813,793

[45] June 4, 1974

[54] CROP PROCESSING DEVICES

[76] Inventors: Cornelis van der Lely, 7, Bruschenrain, Zug; Ary van der Lely, 10, Weverskade, Maasland, both of Netherlands

[22] Filed: Feb. 29, 1972

[21] Appl. No.: 230,230

[30] Foreign Application Priority Data
Mar. 3, 1971  Netherlands.................... 7102792

[52] U.S. Cl.............. 34/57 R, 34/DIG. 12, 34/102
[51] Int. Cl............................................ F26b 17/10
[58] Field of Search ....... 34/102, 11, 10, 57 R, 216, 34/236, 217, DIG. 12

[56] References Cited
UNITED STATES PATENTS

| 1,667,428 | 4/1928 | Mason | 34/DIG. 12 |
| 1,740,075 | 12/1929 | Dalton | 34/DIG. 12 |
| 2,465,928 | 3/1949 | Reese | 34/102 X |

FOREIGN PATENTS OR APPLICATIONS

| 661,833 | 3/1929 | France | 34/57 R |
| 552,176 | 3/1943 | Great Britain | 34/102 |

Primary Examiner—William E. Wayner
Assistant Examiner—William C. Anderson
Attorney, Agent, or Firm—Mason, Mason & Albright

[57] ABSTRACT

A crop drying device includes an enclosed chamber with at least one blower in a conveying channel that extends from one drying zone to another drying zone. Endless conveyors move crop within the chamber as crop is recycled through the device. A heating system is associated with the blower to heat the air stream in the conveying channel and zones. The device is particularly adapted for drying long-leafed or long-stemmed crop and a rotatable dosing mechanism with tines is positioned at an angle to the rear of the chamber to move the crop from one conveyor to another. The rotatable dosing device has tines that are moved to pick up small doses of crop and deposit same on conveyors at the lower portion of the device. Flaps in the conveying channel can be set to recycle or move the crop to a storage area.

40 Claims, 17 Drawing Figures

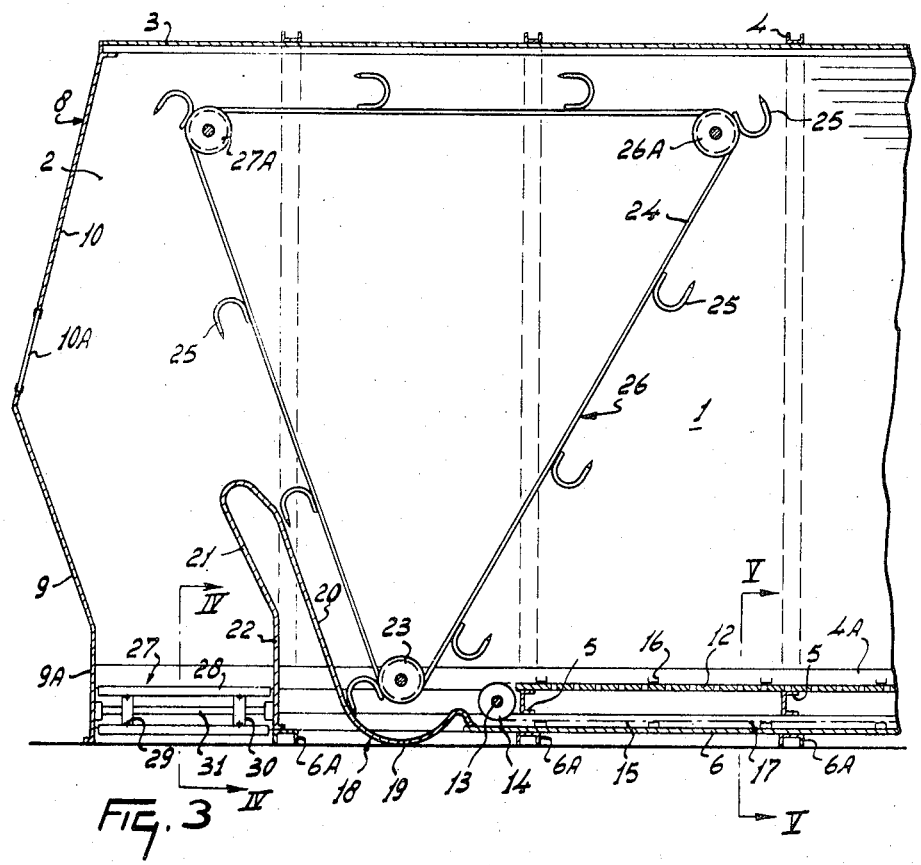
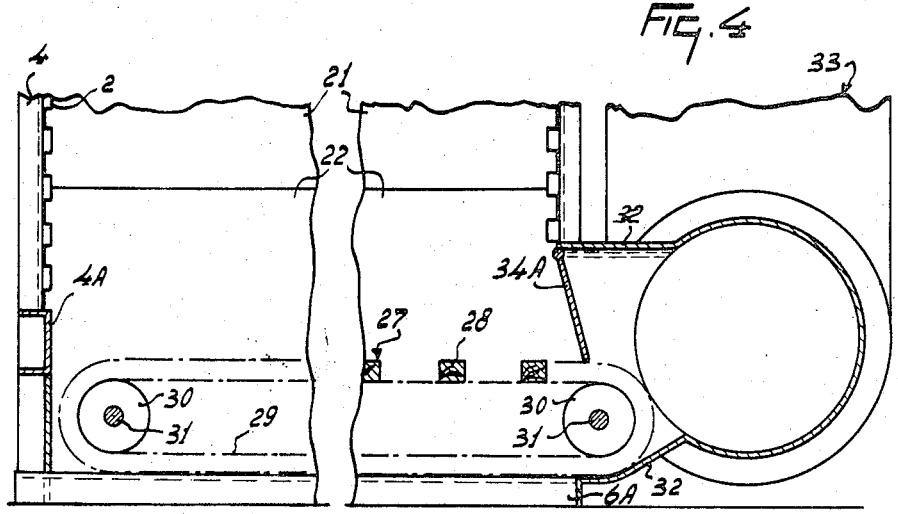

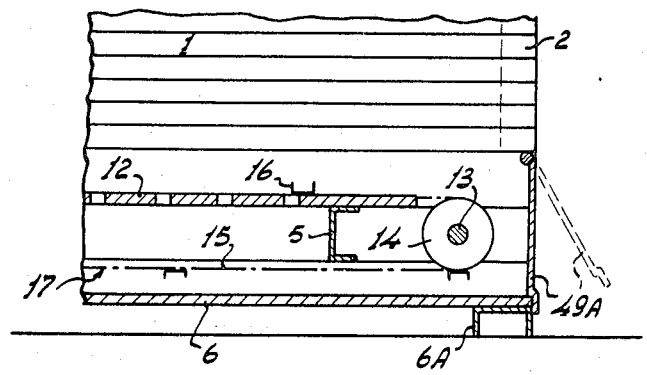
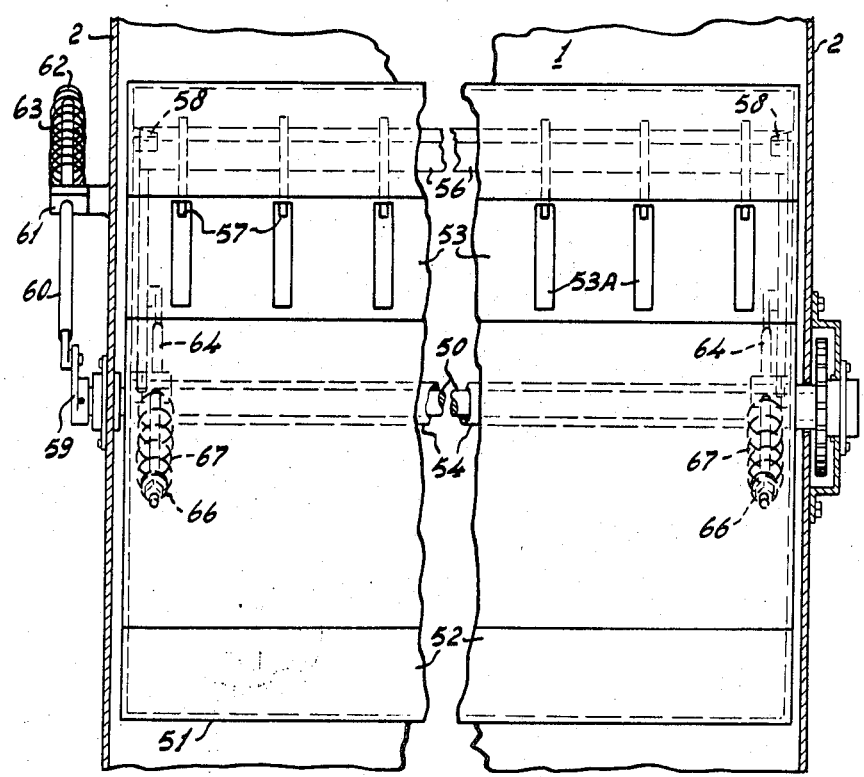

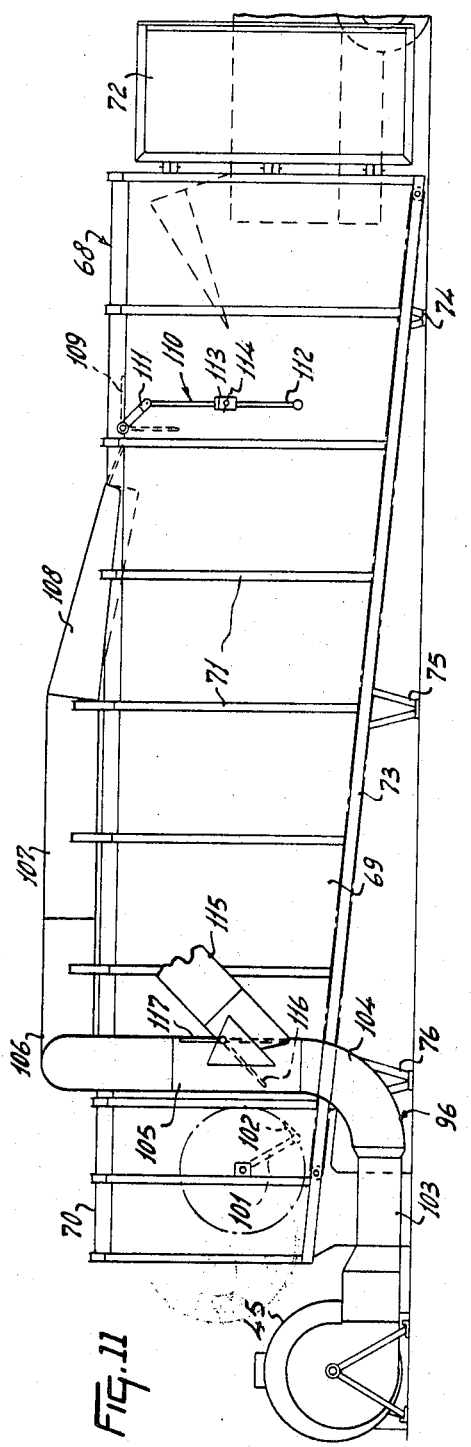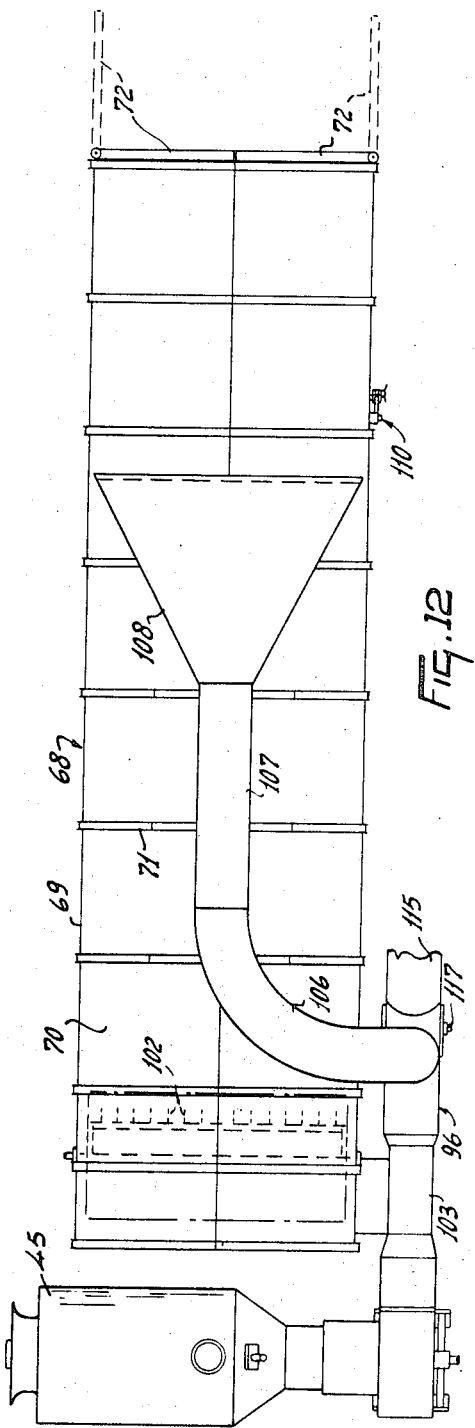

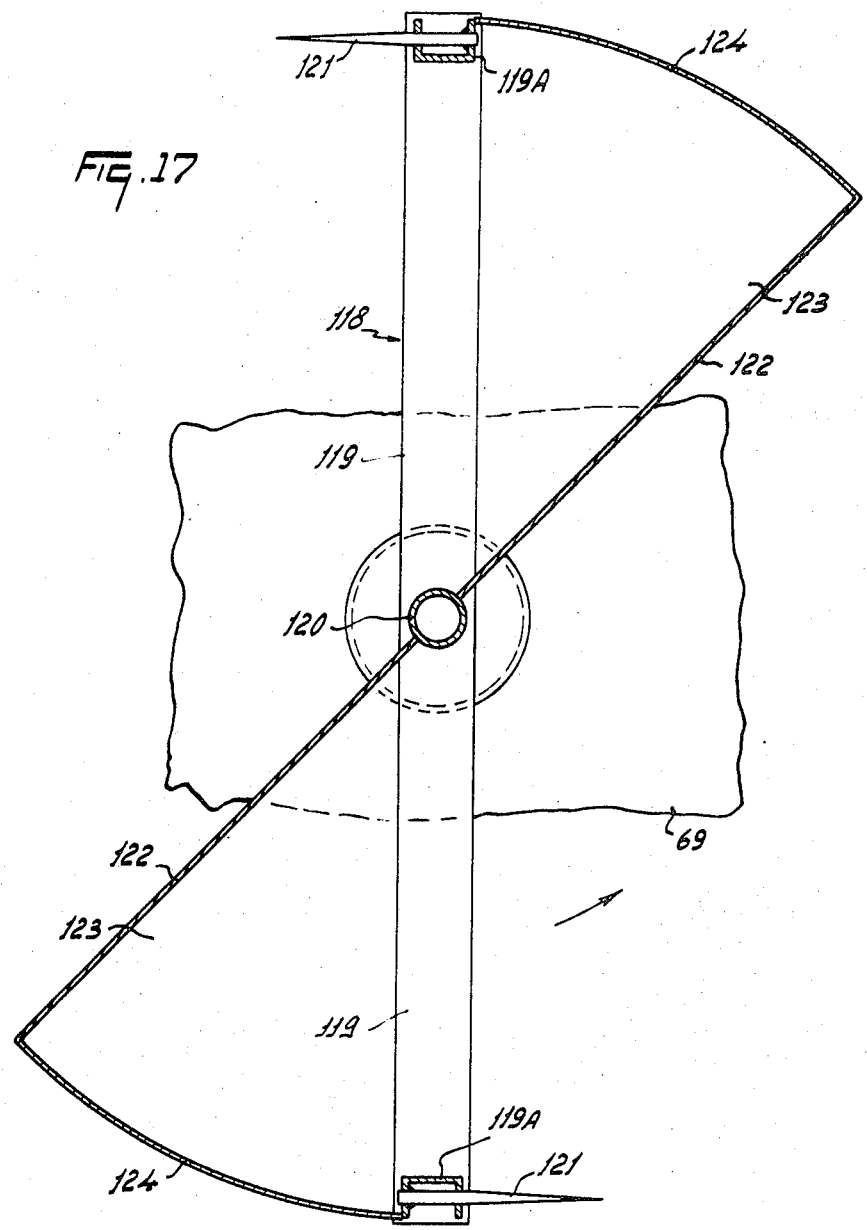

3,813,793

CROP PROCESSING DEVICES

SUMMARY OF THE INVENTION

According to a first aspect of the present invention there is provided a crop drying device comprising a crop drying space and pneumatic means including at least one blower and a conveying channel extending from one zone of the drying space to another zone of the drying space, so that crop passed from the space into the conveying channel during the drying process can be reintroduced into the space, the blower being arranged between the conveying channel and a heating system communicating with the blower so that the crop displacing air stream is heated and at least part of the heat required for the drying process is transferred in this way to the crop during its transport.

According to a second aspect of the present invention there is provided a crop processing device comprising a crop receiving space and dosing means arranged at one end of the crop receiving space, the dosing means comprising a tined conveyor which extends as far as above the zone that crop can reach in the crop receiving space in operation and which is, at its side that is upstream with respect to the supply of crop thereto in operation, at an angle of less than 60° to the horizontal.

According to a third aspect of the present invention there is provided a crop processing device comprising a crop receiving space and dosing means arranged at one end of the space, the dosing means comprising an endless, tined conveyor which is arranged so that, viewed from one side, it forms a triangle having its base formed by the uppermost run of the conveyor.

According to a fourth aspect of the present invention there is provided a crop processing device comprising a crop receiving space and dosing means arranged at one end of the crop receiving space, the dosing means comprising at least one rotatable member which is provided at its periphery with one or two rows of tines.

According to a fifth aspect of the present invention there is provided a crop processing device comprising a crop receiving space and dosing means arranged at one end of the crop receiving space, the dosing means comprising a rotatable member provided at its periphery with tines extending substantially tangentially to a rotary shaft of the member.

For a better understanding of the invention and to show how the same may be carried into effect, reference will now be made, by way of example, to the accompanying drawings, in which:

BRIEF DESCRIPTION OF THE DRAWINGS

FIG. 3 shows on an enlarged scale a dosing mechanism disposed near one end of a crop receiving space of the device of FIGS. 1 and 2, FIG. 4 is a sectional view taken on the line IV—IV in FIG. 3, FIG. 6 is an end, enlarged, partial sectional view of part of the crop receiving space of the device of FIGS. 1 to 5, FIG. 10 is a longitudinal sectional view of a rotary member of the dosing mechanism of FIGS. 7 to 9, FIG. 11 is a schematic side view of a second form of crop processing device, FIG. 12 is a plan view of the device shown in FIG. 11, FIG. 17 shows a second form of a rotary member for the dosing mechanism of the processing device of FIGS. 11 to 16.

DESCRIPTION OF THE PREFERRED EMBODIMENTS

The crop processing devices illustrated in the Figures will generally be used for drying crop and to this end the processing space 1 of the form of FIGS. 1 to 10, or the processing space 68 of the forms of FIGS. 11 to 17, normally serves, in each case, as a crop drying space.

Figure 1:
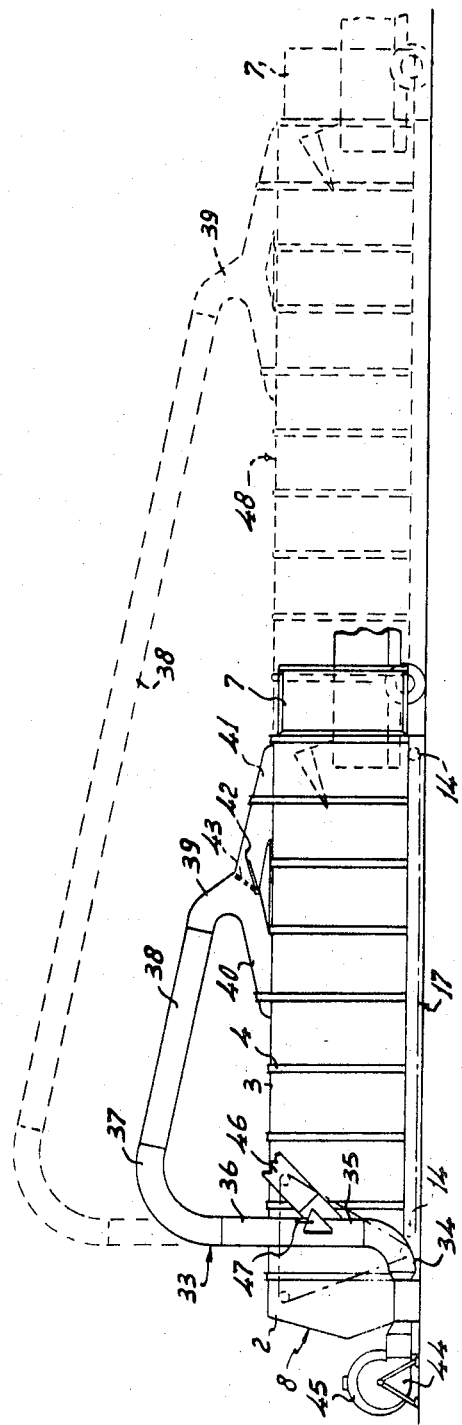
FIG. 1 is a schematic side view of a first form of crop processing device.
Figure 2:
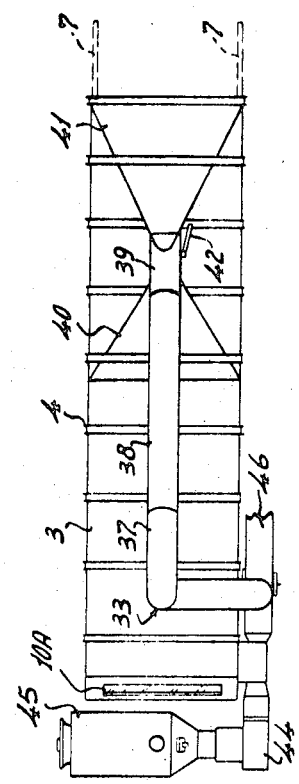
FIG. 2 is a plan view of the device shown in FIG. 1.
Figure 5:
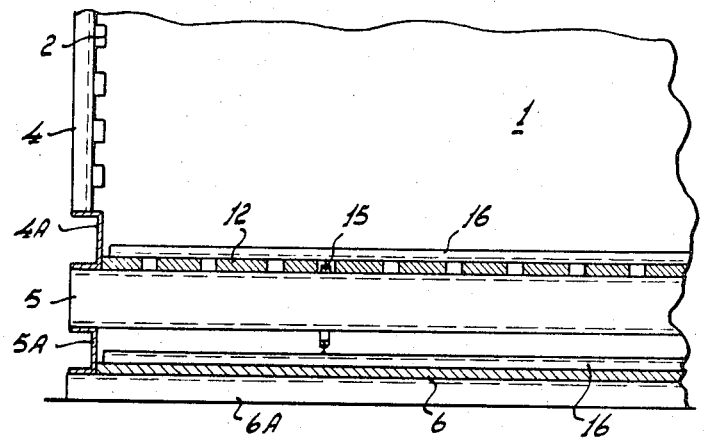
FIG. 5 is a sectional view taken on the line V—V in FIG. 3.

From FIGS. 1 and 2 it will be apparent that this elongated space 1 is bounded by vertical walls 2 of profiled sheet, interconnected along their tops by a top wall 3. At regular intervals U-profiled brackets 4 are disposed around the walls 2 and 3. The limbs of each of the brackets 4 are connected at their lower ends by means of longitudinal beams 4A (FIGS. 3 and 5), extending in the direction of length of the drying space 1. Beneath the beams 4A, connecting beams 5 extend transversely of the longitudinal center line of the space 1. The connecting beams 5 are secured to longitudinal beams 5A, which bear on transverse beams 6A, on which a horizontal wooden cover plate 6 is placed (FIG. 5).

At one end the space 1 is closed by doors 7 that pivot around vertical axes, through which the crop to be dried can be introduced into the space 1. The end with the doors 7 will be termed hereinafter the front end. The rear end of the space 1 is closed by a wall 8 having two substantially straight portions 9 and 10 including an angle therebetween (FIG. 3) such that the wall 8 bulges outwardly. The top portion 10 has an observation hole 10A, and the portion 9 is extended downwards vertically by a part 9A.

The beams 5 support a perforated wooden floor 12. Near the front and rear ends of the floor 12 shafts 13 extending transversely of the longitudinal center line of the space are held in bearings supported by the walls 2. Near their ends the shafts 13 carry chain sprockets 14, around which chains 15 are passed which are connected with each other by angle-section irons 16 so as to form together an endless conveyor 17. The upper run of the conveyor 17 cooperates with the perforated floor 12, whereas in operation the lower run moves along the plate 6. The plate 6 joins at the rear a plate 18, which has a curved portion 19 extending from the junction with the plate 6 and thereafter continuing with an upwardly rearwardly inclined straight portion 20, a reverse substantially U-portion, a portion 21 extending substantially parallel to the wall portion 9, and a portion 22 extending vertically downwards and secured to the rearmost transverse beam 6A.

Concentric with the curved portion 19 of the plate 18 a roller 23 extends transversely of the longitudinal center line of the drying space 1 between the walls 2, held by stub shafts. One or more belts 24 pass around the roller 23 and around rollers 26A and 27A, extending parallel to the roller 23. The rollers 26A and 27A are disposed at the same level spaced from each other on either side of the roller 23 in the upper part of the space 1 between the walls 2 so that, viewed from the side, each belt 24 forms a substantially isosceles triangle, the base of which is located at the top and extends substantially in a horizontal direction. The belt 24 has rows of hook-like tines 25, the sharp tips of which extend approximately parallel to the belt in the direction of movement of the belt. The tined belt or belts form an endless conveyor 26, the front run of which, that is to say the run facing the drop inside the space 1, extends as far as above the crop and is at an angle of less than 60° to the horizontal. From FIG. 3 it will be seen that the tines 25 on the rear run of the conveyor 26 move along the portion 20 and the curved portion 19 of the plate 18. The width of the conveyor 26 is equal to the whole width of the space 1.

Together with the portion 9 of the rear wall 8, the portions 21 and 22 of the plate 18 bound a space to the rear of the drying space 1 and in the base of which an endless, horizontal conveyor 27 extends transversely of the longitudinal center line of the drying space 1 between the portion 9A of the portion 9 and the portion 22 of the plate 18. The conveyor 27 comprises of chains 29, interconnected by transverse parts 28 and passed around chain sprockets 30 which are secured to shafts 31 held in the portions 9A and 22 (FIG. 4). Near one end of the conveyor 27 the space 1A is closed by one of the walls 2. The other end of the conveyor 27 extends through an opening in the opposite wall 2. Via a connecting portion 32 this opening communicates with a conveyor channel 33 of circular section. Between the top of the connecting portion 32 and the upper run of the conveyor 27 a pivotable flap 34A permits closing the part of the connection portion 32 above the transverse conveyor 27. At the zone of the transverse conveyor 27 the conveying channel 33 extends horizontally and approximately parallel to the longitudinal center line of the space 1, after which it has an elbow 34 (FIG. 1), a vertical portion 35 which is bent over above the drying space 1 towards the longitudinal center line of the space 1 (FIG. 2), a vertical portion 36, a bent-over portion 37, and a straight portion 38 extending forwardly and downwardly inclined in the direction of length of the drying space 1.

The upwardly extending portion 36 is connected with a branch 46 which can be closed by means of a flap 47 and which serves, when open, to convey processed crop to a store (not shown) or elsewhere. The portion 38 joins a bifurcated outlet piece 39 which opens out in the top of the drying space 1 through the spaced apart openings 40 and 41 located one behind the other with respect to the front end of the drying space 1. As apparent in FIG. 2, from the junction with the conveying channel 33 the width of each arm of the outlet piece 39 increases towards the top wall of the drying space 1 so that each arm is formed as a funnel. At the bifurcation between the two arms a flap 43 is mounted to turn about a substantially horizontal shaft, activated by a lever 42, in order to permit closing of either of the outlets 40, 41.

At the rear, just behind the transverse conveyor 27, the conveying channel 33 communicates with the housing of a blower 44, which communicates at its intake side with a heating system 45 so that air drawn in by the blower 44 to be supplied to the channel 33 can be heated by the system 45. No sidewalls are provided between the perforated floor 12 and the plate 6 along the bottom of the drying space 1 so that elongated slots are formed through which air supplied via the channel 33 can escape via the openings in the floor out of the drying space 1, which is otherwise substantially hermetically closed by the doors 7.

The device described above operates as follows:

With the aid of a loading wagon or the like a charge of crop can be placed on the endless conveyor 17 when the doors 7 at the front of the space 1 are open. By driving the conveyor 17 from a prime mover, for example, an electric motor at the rear, the crop on the conveyor is gradually passed to the rear. When the loading wagon has been unloaded, the doors 7 are closed and the wagon may fetch a new load from the field. The crop within the device is moved by the conveyor 17 gradually to the rear until it becomes within the reach of the portion inclined forwardly at an angle of less than 60° of the endless conveyor 26 provided with the hook-like tines 25. This conveyor 26 is conveniently also driven by the prime mover driving the endless conveyor 17. Each of the tines 25 of the endless conveyor 26, which constitutes a dosing device, carries upwardly a small batch or dose of the crop displaced rearwardly by the conveyor 17 and disengages it subsequently above the transverse conveyor 27, the flap 34A then occupying the position shown in solid lines in FIG. 4. During the passage of the crop carried along the conveyor 26 the flap 34A is lifted, but it tends to return to its initial position by its weight so that undesirable loss of air from the drying space 1 is minimized. The blower 44 passes air heated by the heating system 45 into the conveying channel 33 and this air stream passes over the dosed quantities of crop introduced into the conveying channel 33 by means of the transverse conveyor 27, the air flowing across the conveying channel 33 towards the front end of the drying space 1. While the doors 7 are closed, the flap 43 between the outlets 41 and 42 is moved by means of the external lever 42 into the position in which the rearmost outlet 40 is closed and crop is deposited at the front of the drying space 1, via the outlet 41, on the front part of the conveyor 17. At the return of the loading wagon from the field the doors 7 are re-opened, after the flap 43 has been moved into the position in which crop is deposited via the rearmost outlet 40 on the conveyor 17, so that by closing the outlet 41 crop is prevented from being thrown out of the drying space 1 when the doors 7 are open. After discharge of the loading wagon, which may be performed rapidly, the doors 7 are closed again, the outlet 41 re-opened and the drying process continued, the new charge then also taking part in the drying process. By a plurality of wagon loads the drying space 1 may be filled to an extent such that a layer of crop more than one meter thick is located on the conveyor 17. This layer is slowly moved to the rear. At the top of the drying space 1 the volume of air is constantly replenished via the conveying channel 33 and from there air passes across the crop in downward direction and escapes in a water-vapor-saturated state through the openings in the floor 12 of the drying space 1 and the slots in the bottom.

In the device described above, in which the dosing device constituted by the endless conveyor 26 at the rear of the drying space 1 regularly feeds crop to the conveying channel 33, the blower 44, communicating with the heating system 45, and the hot air thus blown into the conveying channel 33 are capable of moving crop out of the drying space 1 via the conveying channel 33 to pass again through the drying space 1. During this movement the crop is continuously dried by means of the hot air stream which is at a temperature of 40° to 100° C. This air stream, moreover, replenishes the volume of air above the layer of crop. Dust and fine material falling through the openings in the floor 12 is carried to the front by the lower run of the endless conveyor 17 along the bottom plate 6 to be conducted away through an opening extending over the whole width of the drying space 1 when a pivotable flap 49A (FIG. 6) is urged aside. In this way obturation and hence damage of the conveyor is avoided.

When the crop is sufficiently dry, the portion 38 of the conveying channel 33 communicating with the front of the drying space is closed by means of the flap 47 and the opening towards the branch 46 passing, for example, to a store is opened. With the heating system switched off the blower 44 then blows the crop, introduced into the conveying channel 33 by the conveyors 26 and 27, via the branch pipe 46 into the store until the whole quantity of crop is discharged.

The dimensions of the drying space 1 of the device described above and the overall construction are such that a plurality of wagon loads can be processed without the need for postponing commencement of the drying process until the drying space is filled to the desired extent. The length of the drying space 1 is preferably 12.5 ms and the width and the height are preferably 3 ms. The dimensions of the drying device as a whole are such that road transport can still be performed readily by loading the device on a transporter without the need for disassembling the device.

The capacity of the device described above may be raised by attaching an extension 48, shown by broken lines in FIG. 1, the length of which may be 12.5 ms and the width and height 3 ms. With the doors 7 removed, the extension 48 is connected with the drying space 1 in a manner not shown in detail. The extension 48 has a floor conveyor which joins the conveyor 17 of the drying space 1, and there are also provided members for altering the configuration of the conveying channel 33 so that the outlet piece 39 is connected to the extension 48. The doors 7 are mounted at the front of the extension 48.

Referring to FIGS. 7 to 10, instead of the endless conveyor 26 the dosing device at the rear of the drying space 1 may be formed by three rotary members 49 disposed one above the other for rotation about substantially horizontal axes disposed in a plane inclined upwardly and forwardly at an angle of less than 60° to the horizontal. Each of the rotatable members 49 includes a drum 51 that rotates about a shaft 50, the curved wall of the drum being interrupted over a circumferential angle of about 90° and being here closed by a closing member consisting of two straight portions 52 and 53 including an obtuse angle. The smaller portion 53 is formed by a grating of elongated openings 53A extending inwardly from the drum surface.

Inside the drum 51 the drum shaft 50 is surrounded by a sleeve 54 which carries arms 55 near the sidewalls of the drum and extending at right angles to the shaft 50. Near their ends remote from the sleeve 54 the arms 55 are connected, near the drum surface, with each other by a support 56 of angular section extending parallel to the drum shaft 50 and carrying a row of equidistant tines 57 which extend substantially tangentially to a circle concentric with the drum shaft 50. The support 56 may bear on a stop 58 on each side wall of the drum.

Outside the drum 51 the shaft 50 carries an arm 59 which is located, viewed in the direction of length of the shaft, in front of the arms 55 with respect to the intended direction of operative rotation of the shaft 50. The arm 59 has pivoted to it one end of a rod 60 which is passed through a sliding bearing 61 on the side wall 2 of the drying space 1. Between the sliding bearing 61 and a stop 62 at the free end of the rod 60 the rod is surrounded by a compression spring 63.

Each of the arms 55 for the tine support 56 has hinged to it between its ends a rod 64, which is passed through a sliding piece 65 pivoted to a side wall of the drum 1. Between the sliding piece 65 and a stop 66 at the free end of the rod the rod 64 is surrounded by a compression spring 67.

Figure 8:
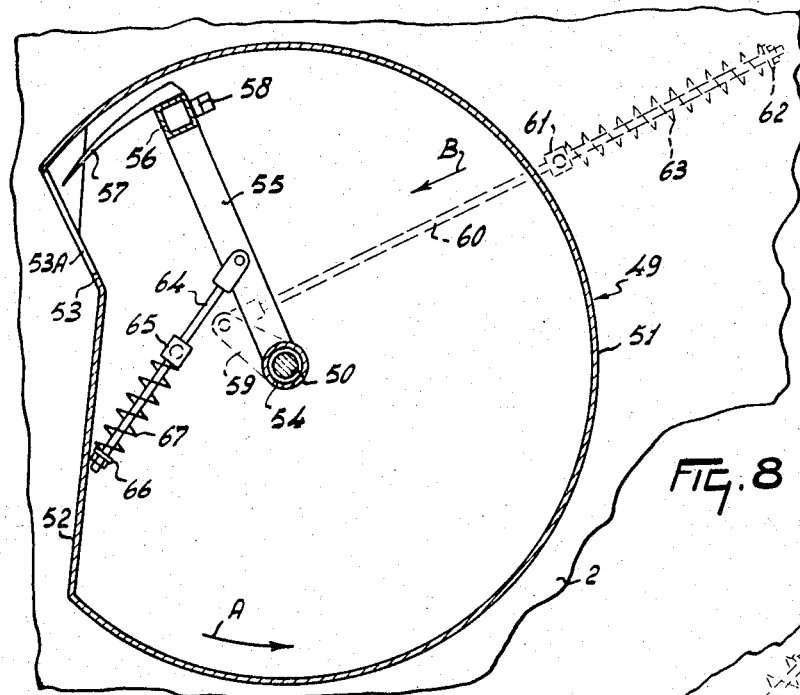
FIGS. 8 and 9 illustrate, on an enlarged scale and in section, operation of a rotary member of the dosing mechanism of FIG. 7.
Figure 9:
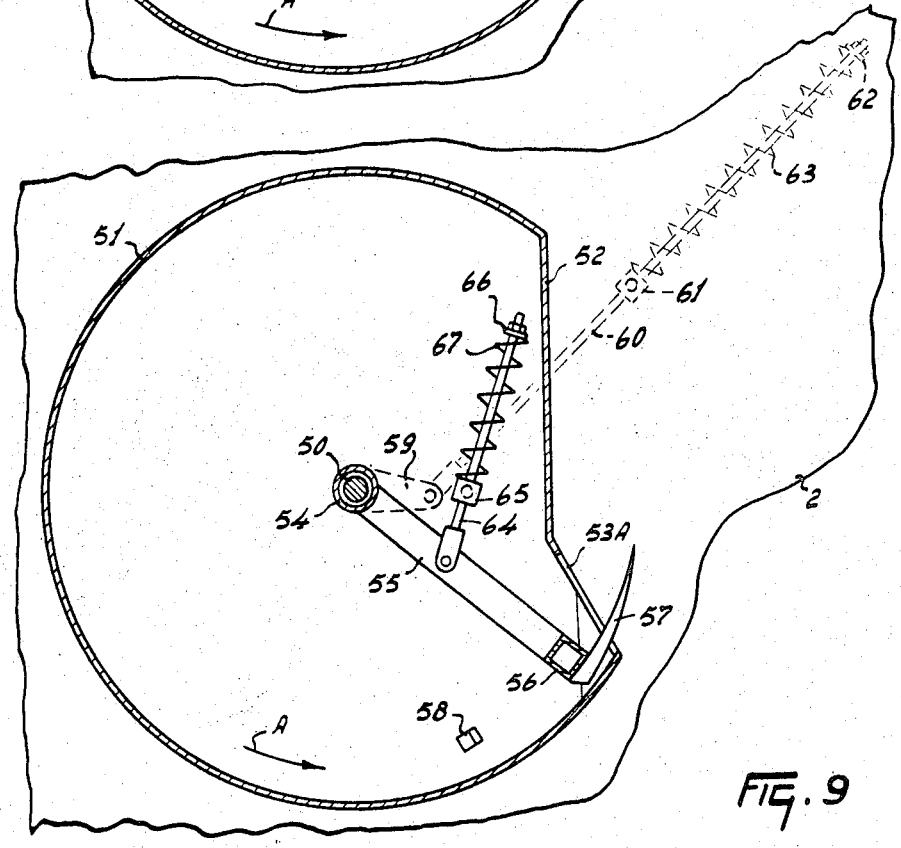
Figure 13:
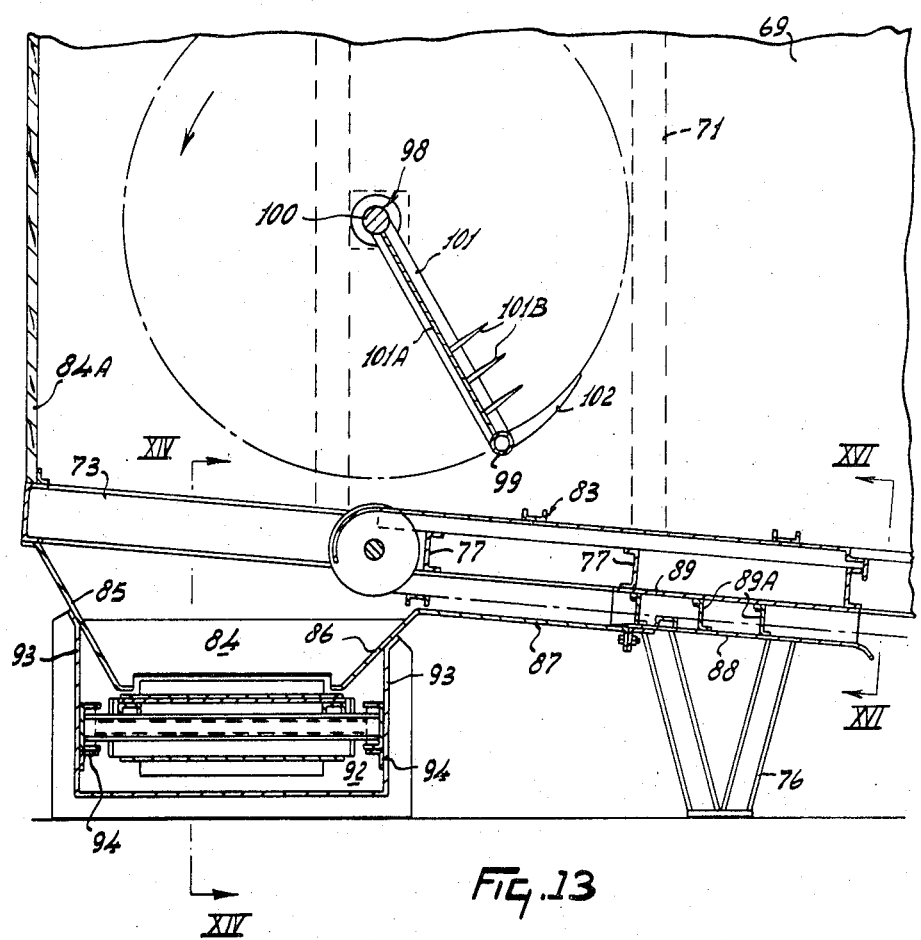
FIG. 13 shows on an enlarged scale a dosing mechanism disposed near one end of a crop receiving space of the device of FIGS. 11 and 12.
Figure 14:
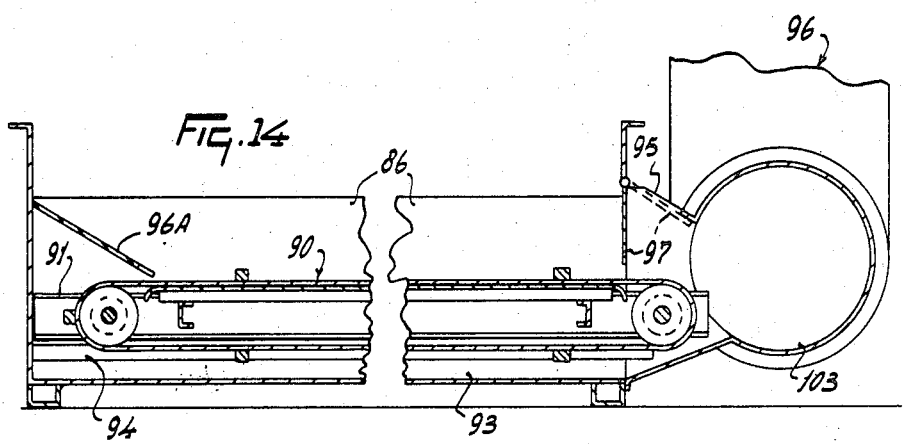
FIG. 14 is a sectional view taken on the line XIV—XIV in FIG. 13.
Figure 15:
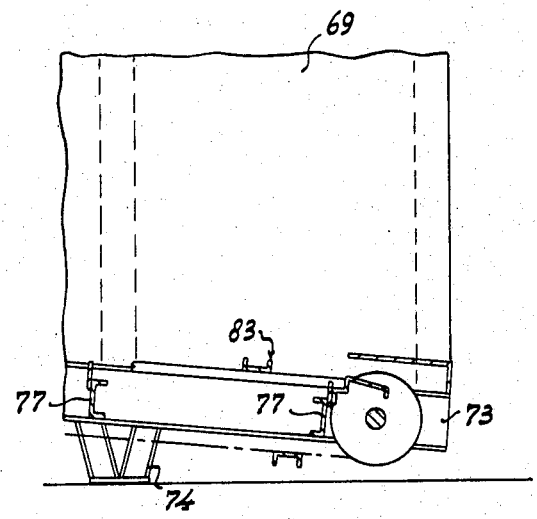
FIG. 15 is a partial sectional end view of part of the crop receiving space of the device of FIGS. 11 to 15.
Figure 16:
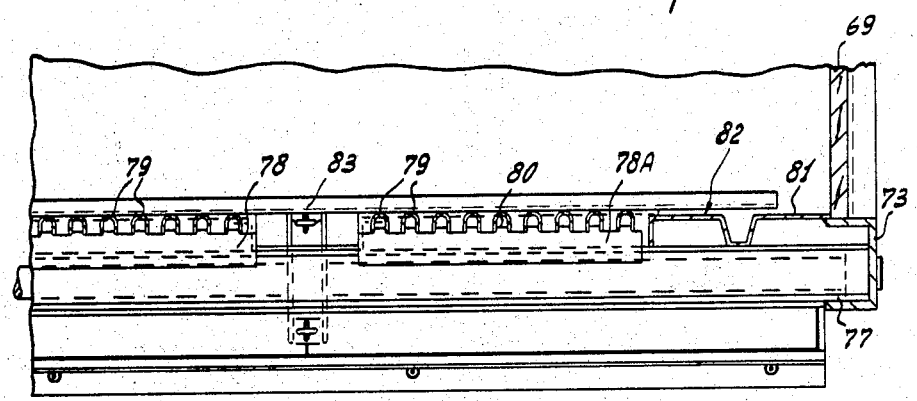
FIG. 16 is a view taken on the line XVI—XVI in FIG. 13.

The drum 51 is rotated by the prime mover (not shown) formed, e.g., by an electric motor in the direction of the arrow A in FIG. 8.

In the position of the drum 51 shown in FIG. 8 the tines 57 are located on the side of the drum shaft 50 remote from the drying space 1 with their supports 56 held against the stops 58 by the action of the rod 60, the tines 57 being then located completely inside the drum. During further rotation of the drum the rod 60 moves out of the position shown in FIG. 8 in the direction of the arrow B so that the compression spring 63 surrounding the rod 60 is further compressed, the rod 60 continuing to draw the tine supports 56 against the stops 58. During still further movement of the drum the arm 59, to which the rod 60 is pivoted, arrives at a position in which the spring 63 attains maximum compression and thereafter the arm 59 moves in a direction such that the spring 63 is released and the tine supports 56 move away from the stops 58. The tines 57 thus emerge through the slots 53A of the portion 53 until they are wholly disposed in the recess closed by the portions 52 and 53. At the instant when the tines become wholly disposed in the recess under the action of the control-mechanism formed by the arm 59, the rod 60 and the spring 63, the drum occupies the position shown for the lowermost drum in FIG. 7. Upon further rotation of the drum the tines 57 engage a batch of crop conveyed rearwardly by the endless conveyor 17 and the batch of crop is gradually loosened and carried along. As the drum reaches the position shown for the topmost drum in FIG. 7 the tines 57 are gradually redrawn inside the drum by the rod 60. In the drum position shown for the central drum in FIG. 7 the tines have again become located completely inside the drum so that the crop has become disengaged from the tines (by the action of the bars of the grating forming the portion 53A) and is disposed in the recess of the drum from which it falls upon further rotation of the drum to drop on the conveyor 27, which introduces it into the the conveying channel 33.

Figure 7:
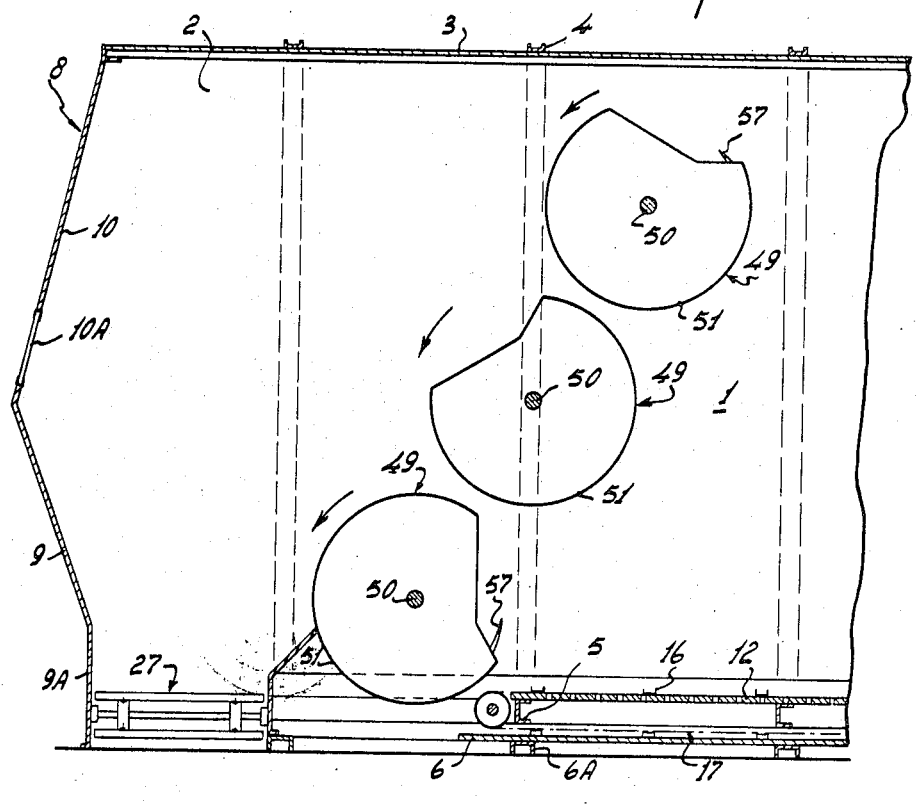
FIG. 7 is a view similar to FIG. 3 of a second form of dosing mechanism.

FIG. 7 shows how the drums 51 are relatively arranged so that the crop engaged and carried along by the tines 57 of the various drums is engaged and passed on at regular intervals. The rods 64, connected with the arms 55 of the tine supports 56 and acted upon by the springs 67, act as dampers to prevent the supports from snapping back to the stops 58 with excessive force, which might cause damage. The grating forming the portion 52A of the drum constitutes an effective scraping mechanism for the tines so that disengagement of the crop is materially simplified.

In the form of FIGS. 11 to 16 an elongated drying space 68 is bounded by upright wooden sidewalls 69 and a wooden roof 70 interconnecting the sidewalls. At the front the space can be closed by doors 72. The sidewalls are embraced by spaced U-shaped brackets 71, the limbs of the consecutive brackets being shorter from the front to the rear of the drying space. The free ends of the limbs are connected with each other by longitudinal beams 73 on each side of the space 68, the longitudinal beams being supported each by supporting feet 74, 75 and 76 the length of which increases from the front of the space 68. Between the longitudinal beams 73 transverse beams 77 extend, on which bear supporting pieces 78 and 78A which hold spaced elements 79 extending in the direction of length of the drying space 68. Each longitudinal element 79 is formed by a U-shaped strip mounted on extensions 80 on a supporting piece 78, 78A respectively. On the sides the longitudinal elements 79 join plate-shaped parts 81 which extend up to the upright sidewalls 69. The longitudinal elements 79 together with the parts 81 constitute a floor 82 which is provided between the longitudinal elements 79 with slot-shaped apertures.

As in the form of FIGS. 1 to 10, an endless conveyor 83 is provided co-operating with the floor 82 and having the same construction as the conveyor 17 already described. However, in this form no plate is provided beneath the conveyor 83.

Between a rear wall 84A and the rear end of the conveyor 83 a space 84 is provided extending transversely of the longitudinal center line of the drying space 68. On its rear the space 84 is bounded by a plate 85 which is inclined downwardly and forwardly from the rear wall 84A. The front of the space 84 is bounded by a forwardly and upwardly inclined plate portion 86 which terminates in a portion 87 extending beneath the floors 82 parallel to and spaced from the floor 82. The portion 87 is joined by a plate 88 which is also parallel to the floor 82 except where it is slightly bent over downwardly at the front. The lower run of the conveyor 83 passes through the space between the plates 87 and 88 and the floor 82. Between a plate 89 on the bottom of the transverse beam 77 and the plate 88, elastic closing flaps 89A are provided so that an air sluice is formed.

The bottom of the space 84 is defined by an endless conveyor 90 extending over the whole width of the drying space 68. The conveyor 90, which is of generally known structure, is displaceably supported by a frame 91 in a closed space 92 and the upper run of the conveyor being located between the lower ends of the plates 85 and 86. The supporting frame 91 is held by supports 94 extending from upright longitudinal walls 93 of the space 92. One end of the conveyor 90 extends as far as into a connecting portion 95 communicating with the spaces 84 and 92 and opening out in a sidewall of a conveying channel 96. The other end of the conveyor extends as far as beneath a guide plate 96A, inclined downwardly between the plates 85 and 86. Above the end of the conveyor 90 located in the connecting portion 95 a pivotable flap 97 is provided for minimizing air losses during the delivery of crop.

In this form the dosing device includes a rotatable member 98 supported above the rear end of the conveyor 83 and provided with a tine support 99 which is held by arms 101 extending from near the ends of a rotary shaft 100. A screening plate 101A provided with a plurality of pins 101B is supported between the arms 101. The support 99 is provided with a row of tines 102 extending substantially tangentially to the shaft 100. The width of the rotatable member 98 is approximately equal to the width of the drying space 68 and the length of the arms 101 is greater than 50 cms, and preferably it is 65 cms. The rear of the rotatable member 98 is located above the transverse conveyor 90.

The circular-section conveying channel 96 extends horizontally through a portion 103 at the area of the conveyor 83. This portion 103 connects, via an elbow 104, with an upwardly extending portion 105 which connects through a curved portion 106 with a substantially horizontal portion 107 extending near the center on top of the drying space 68 to the front to communicate through a funnel-shaped outlet 108 with the top of the drying space. Inside the drying space 68, near the outlet 108, a flap 109 can be moved into either of two positions by means of an external rod system 110. The rod system 110 is made up of a lever 111 extending from the pivotal shaft of the flap 109 and pivotally coupled with a downwardly extending setting rod 112 which passes through a sliding piece 113, with respect to which it can be fixed in any one of a plurality of positions by means of a wing bolt 114.

The upwardly extending portion 105 of the conveying channel 96 has a branch pipe 115 extending therefrom by which the conveying channel 96 can be placed in communication with a store or elsewhere. The branch pipe 115 can be closed by means of a flap 116 which can be actuated from the outside with the aid of an arm 117. From FIG. 11 it will be apparent that the flap 116 also permits closing the portion 107 of the conveying channel 96 communicating with the front of the drying space 68.

FIG. 17 shows a rotatable member 118 of another form of dosing device, in which two pairs of aligned arms 119 are mounted on a rotary shaft 120. Between the free ends of each pair of arms 119 a support 119A extends parallel to the shaft 120, each of which supports carries a row of tines 121. The tines are at an angle to the radian. Between the arms 119 and the rotary shaft 120 aligned screening plates 122 are secured, displaced through a circumferential angle of about 40° behind, with respect to the direction of intended operational rotation of the member 118, the arms 119. At each side a plate 123 is provided between each of the arms 119 and the plate 122, and a plate 124 is provided between the supports 119A and the plate 123, the assembly thus forming two opposed troughs each having the tines 121 at the front with respect to the intended direction of operational rotation of the member 118. The diameter of the path traced by the tines 121 is larger than 100 cms and is preferably 130 cms.

The operation of the crop drying devices of FIGS. 11 to 17 corresponds largely with the operation of the device of FIGS. 1 to 10. In the devices of FIGS. 11 to 17 the walls of the drying space, with the exception of the floor, are airtight as they are in the device of FIGS. 1 to 10 and a plurality of wagon loads may be introduced successively into the drying space, while drying can start after the insertion of the first load. To this end, when a wagon is unloaded, the flap 109 is moved by means of the rod system 111 into a position in which the flap is orientated downwardly so that the crop fed via the conveying channel is not thrown too far to the front. When the doors 72 are closed, the flap 109 is moved into a position in which it is substantially horizontal, the crop being then displaced to the front of the drying space, from where it is conveyed by the conveyor 83 in a layer of more than 1 m thick.

At the rear end, in the device of FIGS. 11 to 16, the rotatable member 98 of the dosing device, which may have a speed of rotation of 50 RPM, feeds the crop in small, regular quantities to the transverse conveyor 90, which introduces the crop into the conveying channel. The tines 102 disengage a batch of crop, which is carried along on the plate 101 and held thereon by the pins 101B. Finally it is disengaged above the conveyor 90. Where the rotatable member 118 of FIG. 17 is provided the crop is carried in the trough formed by the plates 122 and 123. The speed of rotation may be adjusted with respect to the diameter so that the crop not carried along at the first passage of the first row of tines is not allowed to drop completely back before it is reached by the second row of tines, which disengage their batches. In the conveying channel 96 the crop is displaced by the air stream from the blower 44, which is heated by the heating system, towards the front of the drying space. At least part of the heat required for the drying process is then transferred to the crop.

In this form the volume of air above the layer of crop in the drying space is replenished by the air displacing the crop across the channel, the air passing downwardly across the crop and escaping, saturated with water vapor, through apertures in the bottom. In order to conduct the crop out of the drying space, the portion of the channel 96 extending to the front is closed by the flap 116 and the branch 115 is opened. By means of the blower 44 the crop can then be blown into a store. As in the form first described the heating system 45 is then switched off. The wooden walls of the drying space provide an effective thermal insulation.

The construction described above provide a high-power drying system of low costs, while the drying process can start during the filling operation. The drying space may be filled and discharged once a day or even once every 2 days.

The devices described above may also be used as dosing devices in which case the heating system is switched off and the crop inserted into the space 1 or 68 can be regularly conducted out of this space by means of the blower with the aid of the dosing means formed by the conveyor 26 or the rotatable members 49, 98 and 118 respectively.

While various features of the machines that have been described, and that are illustrated in the drawings, will be set forth in the following claims as inventive features, it is to be noted that the invention is not necessarily limited to these features and that is encompasses all of the features that have been described and illustrated both individually and in various combinations.

What we claim is:

1. A crop drying device comprising an elongated enclosed drying space and a pneumatic conveying channel with a blower in communication with said drying space, conveying means in the lower aspect of said drying space and said conveying channel bridging a first zone and a second zone in said drying space whereby crop can be recycled in said drying space, said conveying channel including a heating system associated with said blower so that a heated stream of air is delivered and intermingled with crop being conveyed, said conveying channel having an inlet located on one end of said enclosed drying space and the opposite end of said space having an entrance for receiving a load of crop, said inlet comprising a conveyor extending transversely of the longitudinal centerline of said enclosed drying space, and dosing means being positioned in said chamber adjacent said inlet for feeding regular quantities of crop out of the drying space to said conveyor.

2. A device as claimed in claim 1, wherein said conveyor is an endless movable conveyor that extends substantially horizontally.

3. A device as claimed in claim 2, wherein the length of said conveyor is approximately equal to the width of said enclosed drying space.

4. A device as claimed in claim 3, wherein said dosing means has a side which is downstream with respect to said entrance for receiving a supply of crop and said side is located above said conveyor.

5. A device as claimed in claim 1, wherein said dosing means comprises a movable/tined conveyor which occupies one end of said drying space, the forward side of said tined conveyor being upstream with respect to said entrance and extending at an angle of less than 60° with respect to the horizontal.

6. A crop drying device comprising an elongated enclosed drying space with an entrance at one end thereof and a dosing device adjacent the opposite end, endless conveying means extending from said entrance to said dosing device, said dosing device comprising movable tined conveyor means which occupies substantially the entire cross sectional area of said space, said tined conveyor means being at least one rotatable member mounted on a rotary shaft, said member having a plurality of tines that extend tangentially with respect to said shaft, said dosing device including a scraping mechanism located adjacent the path of movement of said tines, said scraping mechanism comprising a rotatable drum and a row of tines being arranged within said drum, a control-mechanism on said drum being associated with said tines to move same out of the drum during revolution of the drum.

7. A device as claimed in claim 6, wherein said drum wall has a recess and a grating is mounted in said recess, said tines emerging through said grating during rotation of the drum.

8. A crop drying device comprising an elongated enclosed drying space with an entrance at one end thereof and a dosing device adjacent the opposite end, endless conveying means extending from said entrance to said dosing device, said dosing device comprising movable tined conveyor means which occupies substantially the entire cross-sectional area of said space, said tined conveyor means being at least one rotatable member mounted on a rotary shaft, said member having a plurality of tines that extend tangentially with respect to said shaft, said dosing device including a scraping mechanism located adjacent the path of movement of said tines, said tines being mounted on a common support which is turnable about said shaft through a predetermined angle by a control-mechanism which is provided therefor, said control-mechanism comprising a rod pivoted to said tine support and longitudinally displaceable against spring means connected thereto, a stop on said drum retaining said rod during revolution of said drum.

9. A device as claimed in claim 8, wherein said rod is mounted to retain said tine support on the stop inside said drum for half of a revolution thereof, and, during the other half of the revolution, said support being pivoted by said rod and said spring means, which engages said rod so that the tines emerge through said grating.

10. A device as claimed in claim 8, wherein said rod is pivoted to a crank arm on said shaft.

11. A device as claimed in claim 8 wherein said spring means engages said tine support to brake same when the arm is pivoted back against said stop.

12. A crop drying device comprising an elongated enclosed drying space and a pneumatic conveying channel with a blower in communication with said drying space, conveying means in the lower aspect of said drying space and said conveying channel extending from an inlet in the rear of said space to an outlet in the top of said space at the forward end thereof, said conveying means comprising an endless conveyor which extends from the forward end of said drying space to adjacent said inlet, an extension for said drying space which is adapted to be connected thereto at the forward end thereof.

13. A device as claimed in claim 12, wherein said extension also comprises an enclosed floor conveyor and said extension has connecting means for receiving the forward end of said drying space and outlet thereof of said conveying channel near the top and front of said extension.

14. A crop drying device comprising an elongated enclosed drying space with an entrance at one end thereof and a dosing device adjacent the opposite end, a first endless conveyor extending from said entrance to said dosing device to supply crop to same, said device comprising a rotatable tined conveyor which occupies substantially the entire cross sectional area of said space, a second endless conveyor located to the rear of said dosing device to receive processed crop from same, and a pneumatic conveyor channel having an inlet adjacent said second endless conveyor, said channel extending forwardly and being in communication with the top of said drying space near the entrance thereof, whereby crop can be recycled through said dosing means.

15. A crop drying device comprising an elongated enclosed drying space with an entrance for receiving a load of crop at one end thereof and a dosing device adjacent the opposite end, a first endless conveyor in the lower aspect of said drying space extending from said entrance to said dosing device to supply crop to same, said dosing device comprising a movable tined conveyor which occupies substantially the entire cross-sectional area of said space, a second endless conveyor located to the rear of said dosing device to receive processed crop from same and a conveying channel lying outside the drying space having an inlet adjacent said second endless conveyor, said channel extending forwardly and being in communication with the top of said drying space near the entrance thereof, whereby crop can be recycled by said dosing device, said tined conveyor of said dosing device having a rearward side downstream with respect to said conveying means and said rearward side extending rearwardly at an acute angle relative to the horizontal, a blower being provided associated with a heating system so that a stream of heated air is delivered during operation to the drying space.

16. A device as claimed in claim 15, wherein said tined conveyor of said dosing device is an endless conveyor disposed in said drying space to form substantially a triangle, the base of which is the uppermost run of said conveyor.

17. A device as claimed in claim 16, wherein the upper run of said tined conveyor of said dosing device extends substantially horizontally adjacent the top of said enclosed drying space.

18. A device as claimed in claim 15, wherein said dosing device comprises at least one rotatable tined member, the rotary axis of said tined member extending substantially at right angles to the longitudinal centerline of said enclosed drying space.

19. A device as claimed in claim 18, wherein said rotatable member extends over the whole width of said drying space and includes a plurality of tined members.

20. A crop drying device comprising an elongated enclosed drying space with an entrance for receiving a load of crop at one end thereof and a dosing device adjacent the opposite end, a first endless conveyor in the lower aspect of said drying space extending from said entrance to said dosing device to supply crop to same, said device comprising a movable tined conveyor which occupies substantially the entire cross-sectional area of said space, a second endless conveyor located to the rear of said dosing device to receive processed crop from same, and a conveying channel lying outside the drying space having an inlet adjacent said second endless conveyor, said channel extending forwardly and being in communication with the top of said drying space near the entrance thereof, whereby crop can be recycled through said dosing device, the movable tined conveyor of said dosing device comprising at least one rotatable member having rows of tines adjacent the periphery of said rotatable member, a blower being provided associated with a heating system so that a stream of heated air is delivered during operation to the drying space.

21. A device as claimed in claim 20, wherein each row of tines extends substantially parallel to the rotary axis of said rotatable member and said tines extend substantially in a tangential direction with respect to a rotary shaft which forms the rotary axis of said rotatable member.

22. A crop drying device comprising an elongated enclosed drying space with an entrance for receiving a load of crop at one end thereof and a dosing device adjacent the opposite end, a first endless conveyor in the lower aspect of said drying space extending from said entrance to said dosing device to supply crop to same, said dosing device comprising a movable tined conveyor which occupies substantially the entire cross-sectional area of said space, a second endless conveyor located to the rear of said dosing device to receive processed crop from same and a conveying channel lying outside the drying space and having an inlet adjacent said second endless conveyor, said channel extending forwardly and being in communication with the top of said drying space near the entrance thereof whereby crop can be recycled through said dosing means, the said tined conveyor of said dosing means comprising at least one rotatable member mounted on a rotary shaft, said rotatable member having a plurality of tines extending tangentially with respect to said shaft, a blower being provided associated with a heating system so that a stream of heated air is delivered during operation to said drying space.

23. A device as claimed in claim 22, wherein said tines are arranged in two rows opposite each other on either side of said rotary shaft whereas a screening element is positioned between a row of tines and said rotary shaft.

24. A device as claimed in claim 23, wherein said screening element is located behind a row of tines with respect to the direction of operative rotation of said rotatable member, said screening element including catches.

25. A device as claimed in claim 22, wherein said dosing device includes a scraping mechanism located adjacent the path of movement of said tines, said scraping mechanism comprising a rotatable drum and a row of tines being arranged within said drum, a control-mechanism on said drum being associated with said tines to move same out of said drum during the revolution of said drum.

26. A device as claimed in claim 25, wherein the wall of said drum has a recess and a grating is mounted in said recess, said tines emerging through said grating during rotation of said drum.

27. A device as claimed in claim 25, wherein said tines are mounted on a common support which is turnable about said shaft by said control-mechanism through a predetermined angle, said control-mechanism comprising a rod pivoted to said common tine support and longitudinally displaceable against spring means, a stop on said drum retaining said rod during the revolution of said drum, said rod being mounted to retain said common tine support on the stop inside said drum for half of a revolution thereof, and, during the other half of the revolution, said common tine support being pivoted by said rod and said spring means which engages said rod so that said tines emerge through said grating, said rod being pivoted to a crank arm on said shaft.

28. A device as claimed in claim 22, wherein said tined conveyor means comprises a plurality of rotatable members arranged one above the other in said enclosed drying space, the rotary axes of said rotatable members being located in a line inclined upwardly and at an angle of less than 60° relative to the horizontal.

29. A crop drying device comprising an elongated enclosed drying space with an entrance for receiving a load of crop at one end thereof and a dosing device adjacent the opposite end, a first endless conveyor in the lower aspect of said drying space extending from said entrance to said dosing device to supply crop to same, said device comprising a movable tined conveyor which occupies substantially the entire cross-sectional area of said space, a second endless conveyor located to the rear of said dosing device to receive processed crop from same and a conveying channel lying outside the drying space and having an inlet adjacent said second endless conveyor, said channel extending forwardly and being in communication with the top of said drying space near the entrance thereof whereby crop can be recycled through said dosing means, the lowest run of said first endless conveyor being movable along guide means at the bottom of said drying space and a closeable opening being positioned in said drying space at the forward end thereof whereby particles and dust carried along by said lower run of the endless conveyor can be eliminated, a blower being provided associated with a heating system so that a stream of heated air is delivered during operation to the drying space.

30. A device as claimed in claim 29, wherein the bottom of said drying space is perforated to allow air to escape from said space.

31. A crop drying device comprising an elongated enclosed drying space with an entrance for receiving a load of crop at one end thereof and a dosing device adjacent the opposite end, a first endless conveyor in the lower aspect of said drying space extending from said entrance to said dosing device to supply crop to same, said dosing device comprising a movable tined conveyor which occupies substantially the entire cross-sectional area of said space, a second endless conveyor located to the rear of said dosing device to receive processed crop from same, and a conveying channel outside said drying space having an inlet adjacent said second endless conveyor, said channel extending forwardly and being in communication with the top of said drying space proximate the entrance thereof, whereby crop can be recycled through said dosing means, a blower being provided associated with a heating system so that a stream of heated air during operation is delivered to the drying space.

32. A device as claimed in claim 31, wherein said dosing means comprises a movable tined conveyor which occupies one end of said drying space, the rearward side of said tined conveyor being downstream with respect to said entrance and extending at an acute angle with respect to the horizontal.

33. A device as claimed in claim 31, wherein an extension for said drying space is adapted to be connected thereto at the forward end thereof.

34. A device as claimed in claim 33, wherein said extension also comprises an endless conveyor in the lower aspect of said extension and said extension has connecting means for receiving the forward end of said drying space and the outlet of said conveying channel near the top and front of said extension.

35. A device as claimed in claim 31, wherein said second conveyor extends transversely of the longitudinal centerline of said enclosed drying space, and said dosing device is positioned in said space adjacent said inlet of said conveying channel for feeding regular quantities of crop out of the drying space to said conveying channel.

36. A device as claimed in claim 35, wherein said conveyor is an endless movable conveyor that extends substantially horizontally.

37. A device as claimed in claim 36, wherein the length of said conveyor is approximately equal to the width of said enclosed drying space.

38. A device as claimed in claim 31, wherein said dosing device has a side which is downstream with respect to said entrance for receiving a supply of crop and said side is located above said second endless conveyor.

39. A device as claimed in claim 31, wherein said conveying channel is connected to said drying space to recycle crop through an outlet leading into the forward end of said space and a flat is pivotally mounted in said outlet to direct the movement of crop out of said channel into said drying space.

40. A device as claimed in claim 39, wherein said flap is adapted to be positioned to direct recycled crop obliquely to the rear within said drying space and alternatively, to direct crop to the front of said drying space.

* * * * *